US011892795B2

(12) United States Patent
Yokoi et al.

(10) Patent No.: US 11,892,795 B2
(45) Date of Patent: Feb. 6, 2024

(54) IMAGE-FORMING APPARATUS INCLUDING SHORT-RANGE WIRELESS COMMUNICATION CIRCUIT BOARD AND RELAY CIRCUIT BOARD ARRANGED TO PARTIALLY OVERLAP WITH EACH OTHER

(71) Applicant: BROTHER KOGYO KABUSHIKI KAISHA, Nagoya (JP)

(72) Inventors: Junichi Yokoi, Nagoya (JP); Yohei Hashimoto, Nagakute (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 17/690,065

(22) Filed: Mar. 9, 2022

(65) Prior Publication Data

US 2022/0300230 A1    Sep. 22, 2022

(30) Foreign Application Priority Data

Mar. 18, 2021  (JP) ................................. 2021-044857

(51) Int. Cl.
*G03G 21/16* (2006.01)
*G03G 15/00* (2006.01)
*G06F 3/12* (2006.01)

(52) U.S. Cl.
CPC ........... *G03G 15/80* (2013.01); *G06F 3/1279* (2013.01)

(58) Field of Classification Search
USPC .......................................................... 399/90
See application file for complete search history.

(56) References Cited

U.S. PATENT DOCUMENTS

| | | | | |
|---|---|---|---|---|
| 2013/0322911 | A1* | 12/2013 | Hamaya ................. | G03G 15/80 399/88 |
| 2015/0263411 | A1* | 9/2015 | Asai ......................... | B41J 29/13 343/702 |
| 2018/0101110 | A1 | 4/2018 | Tsukada | |
| 2020/0285188 | A1* | 9/2020 | Okamoto ........... | G03G 21/1619 |

FOREIGN PATENT DOCUMENTS

| | | |
|---|---|---|
| JP | 2018-60090 A | 4/2018 |
| JP | 2018-194661 A | 12/2018 |

* cited by examiner

*Primary Examiner* — Quana Grainger
(74) *Attorney, Agent, or Firm* — Merchant & Gould P.C.

(57) ABSTRACT

An image-forming apparatus includes: a housing having an opening; a top cover configured to cover the opening; a short-range wireless communication circuit board attached to the top cover; a relay circuit board attached to the top cover; and a first wiring connecting the short-range wireless communication circuit board and the relay circuit board to each other. The short-range wireless communication circuit board includes: an antenna configured to transmit/receive radio waves; and a circuit electrically connected to the antenna. At least a part of the circuit and at least a part of the relay circuit board are overlapped with each other in an up-down direction.

15 Claims, 11 Drawing Sheets

IMAGE-FORMING APPARATUS INCLUDING SHORT-RANGE WIRELESS COMMUNICATION CIRCUIT BOARD AND RELAY CIRCUIT BOARD ARRANGED TO PARTIALLY OVERLAP WITH EACH OTHER

CROSS REFERENCE TO RELATED APPLICATIONS

This application claims priority from Japanese Patent Application No. 2021-044857 filed Mar. 18, 2021. The entire content of the priority application is incorporated herein by reference.

BACKGROUND

There has been known an image-forming apparatus communicable with an external device such as an IC card and a smartphone through short-range wireless communication such as near-field communication (NFC). A circuit board for the short-range wireless communication is generally positioned near an upper surface of a housing of the apparatus in view of operability thereof. Accordingly, a wiring from the circuit board to a main circuit board positioned on a side surface of the housing tends to become longer, which may cause generation of noises. To this effect, a relay circuit board may be provided between the circuit board for the short-range wireless communication and the main circuit board.

According to one conventional image-forming apparatus, a circuit board for wireless communication, a circuit board for display, and a relay circuit board are provided on an upper surface of the apparatus. The relay circuit board is arranged at a position between the wireless communication circuit board and the display circuit board.

SUMMARY

However, in the above-described conventional apparatus, the wireless communication circuit board, the relay circuit board, and the display circuit board are arrayed with each other in a front-rear direction. This arrangement causes the image-forming apparatus to be elongated in the front-rear direction, which leads to an increase in size of the image-forming apparatus.

In view of the foregoing, it is an object of the present disclosure to provide a compact image-forming apparatus by improving a layout of the short-range wireless communication circuit board and the relay circuit board.

In order to attain the above and other object, according to one aspect, the present disclosure provides an image-forming apparatus including a housing, a top cover, a short-range wireless communication circuit board, a relay circuit board, and a first wiring. The housing has an opening. The top cover is configured to cover the opening. The short-range wireless communication circuit board is attached to the top cover. The short-range wireless communication circuit board includes: an antenna configured to transmit/receive radio waves; and a circuit electrically connected to the antenna. The relay circuit board is attached to the top cover. The first wiring connects the short-range wireless communication circuit board and the relay circuit board to each other. At least a part of the circuit and at least a part of the relay circuit board are overlapped with each other in an up-down direction.

With this structure, by arranging the short-range wireless communication circuit board and the relay circuit board to overlap with each other in the up-down direction, a space saving layout of the short-range wireless communication circuit board and the relay circuit board in the horizontal direction can be obtained, compared to a structure where the short-range wireless communication circuit board and the relay circuit board side-by-side in the horizontal direction. Accordingly, the image-forming apparatus can be downsized with respect to the horizontal direction, which can make the image-forming apparatus compact.

BRIEF DESCRIPTION OF THE DRAWINGS

The particular features and advantages of the embodiment(s) as well as other objects will become apparent from the following description taken in connection with the accompanying drawings, in which.

DETAILED DESCRIPTION

An image-forming apparatus 1 according to one embodiment of the present disclosure will be described with reference to the accompanying drawings.

Figure 1:
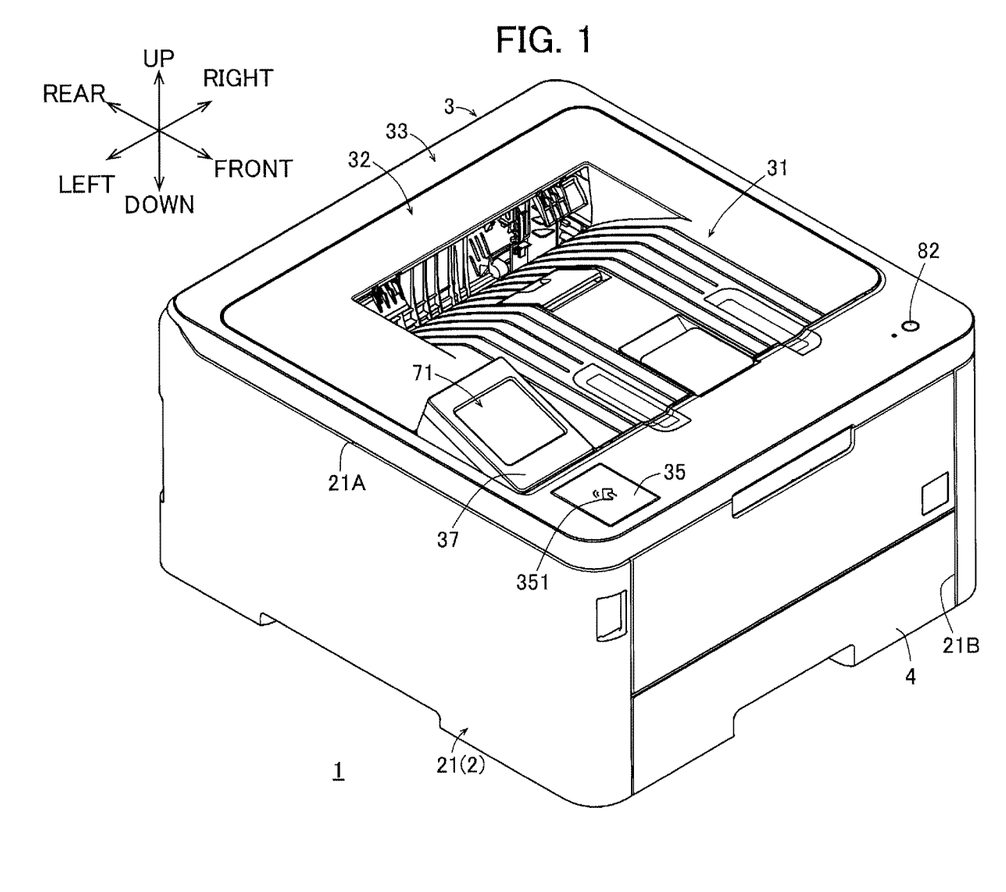
FIG. 1 is a perspective view of an image-forming apparatus according to one embodiment.

Throughout the description, expressions such as "front", "rear", "above", "below", "left" and "right" are used herein to define various parts based on an assumption that the image-forming apparatus 1 is disposed in an orientation in which it is intended to be used as illustrated in FIG. 1. Specifically, in FIG. 1, a sheet discharging direction on a discharge tray 31 (described later) will be referred to as a "frontward direction", and a direction opposite to the sheet discharging direction will be referred to as a "rearward direction." Further, a "leftward direction" and a "rightward direction" will be defined when the image-forming apparatus 1 is viewed from its front side, and sides of a top cover 3 (described later) and a housing 2 (described later) will be referred to as "upper side" and "lower side" respectively. In the present embodiment, a front-rear direction and a left-right direction are coincident with a horizontal direction perpendicular to an up-down direction.

1. Overview of Image-Forming Apparatus 1

FIG. 1 is a perspective view of the image-forming apparatus 1 according to one embodiment. The image-forming apparatus 1 includes the housing 2 and the top cover 3.

The housing 2 includes a frame (not illustrated) supporting various components, and an outer case 21 covering the frame and constituting an outer shell of the housing 2. The outer case 21 has an upper end portion formed with a first opening 21A to provide an open upper end, and a front lower end portion defining a second opening 21B therein.

The housing 2 accommodates therein a sheet tray 4 configured to support a sheet(s) to be printed, a conveying mechanism configured to convey the sheet from the sheet tray 4, an image-forming unit configured to form an image on the sheet conveyed by the conveying mechanism, and a discharge mechanism configured to discharge the sheet from the image-forming unit to an outside of the housing 2.

The sheet tray 4 is movable in the front-rear direction through the second opening 21B so that the sheet tray 4 is configured to be attached to and removed from the housing 2. The image-forming unit may be of various types such as an electro-photographic type, an ink jet type, and a thermal head type. According to the present embodiment, the image-forming unit is of a direct-tandem type capable of performing color printing. Specifically, the image-forming unit of the embodiment includes four drum units juxtaposed in the front-rear direction, LED heads 30 (see FIG. 3) for exposure, and a fixing unit.

The top cover 3 constitutes an upper portion of the image-forming apparatus 1. The top cover 3 is pivotally movably connected to an upper rear end portion of the housing 2 through hinges (not illustrated). The top cover 3 is movable between a closed position (see FIG. 1) where the top cover 3 closes the first opening 21A and an open position where the top cover 3 opens the first opening 21A. Incidentally, the top cover 3 may be immovably fixed to the housing 2.

The top cover 3 has an upper surface defining the discharge tray 31 configured to support the sheet discharged by the discharge mechanism. The discharge tray 31 has a convex shape including an uphill portion that is inclined diagonally upward toward the front. After image formation is performed on a sheet, the sheet is discharged by the discharge mechanism toward the front onto the discharge tray 31.

2. Top Cover 3 and Components Attached to the Top Cover 3

Next, the top cover 3 and components attached to the top cover 3 will be described in detail with reference to FIGS. 2 through 11.

Figure 2:
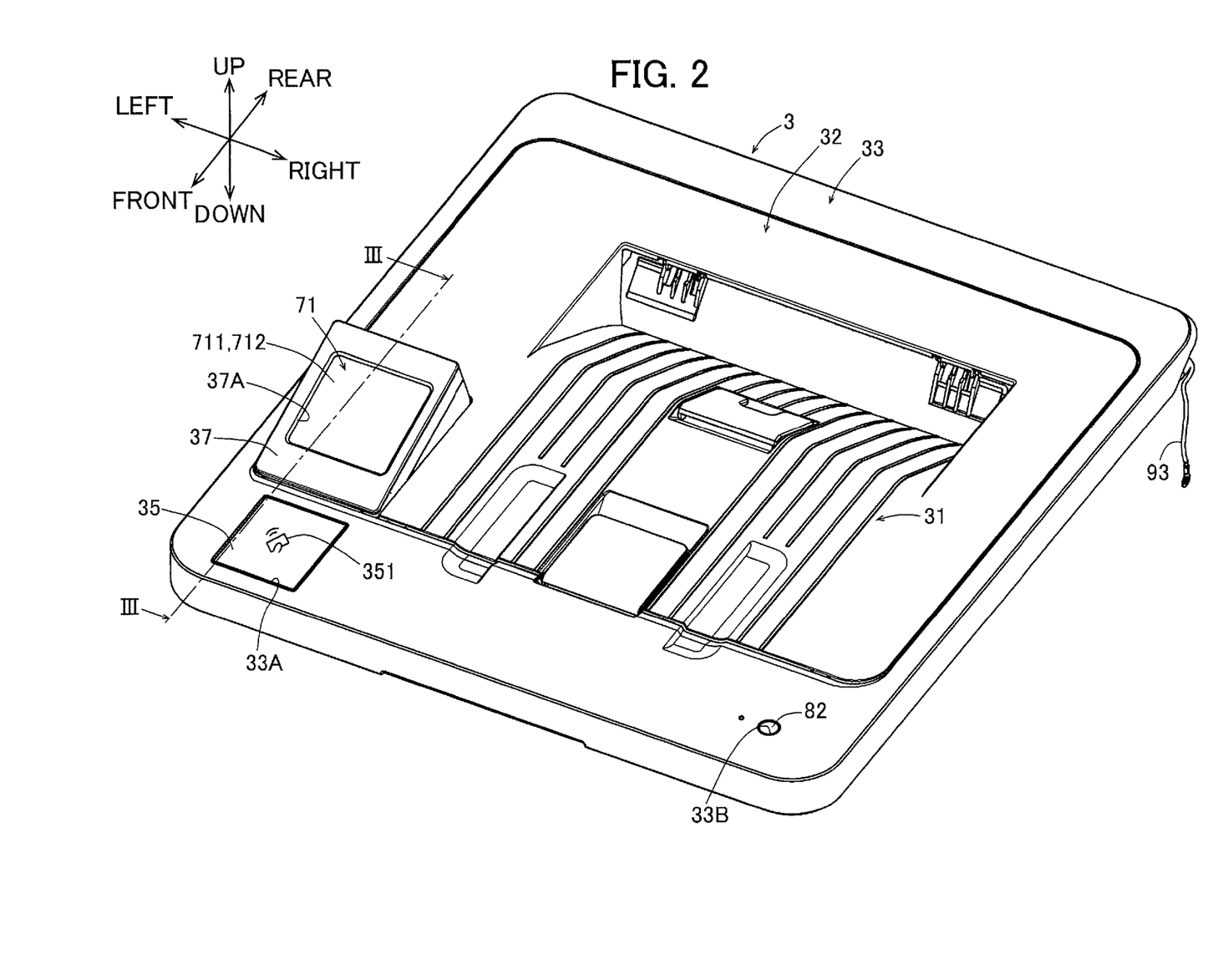
FIG. 2 is a perspective view of a top cover and components attached to the top cover in the image-forming apparatus.
Figure 3:
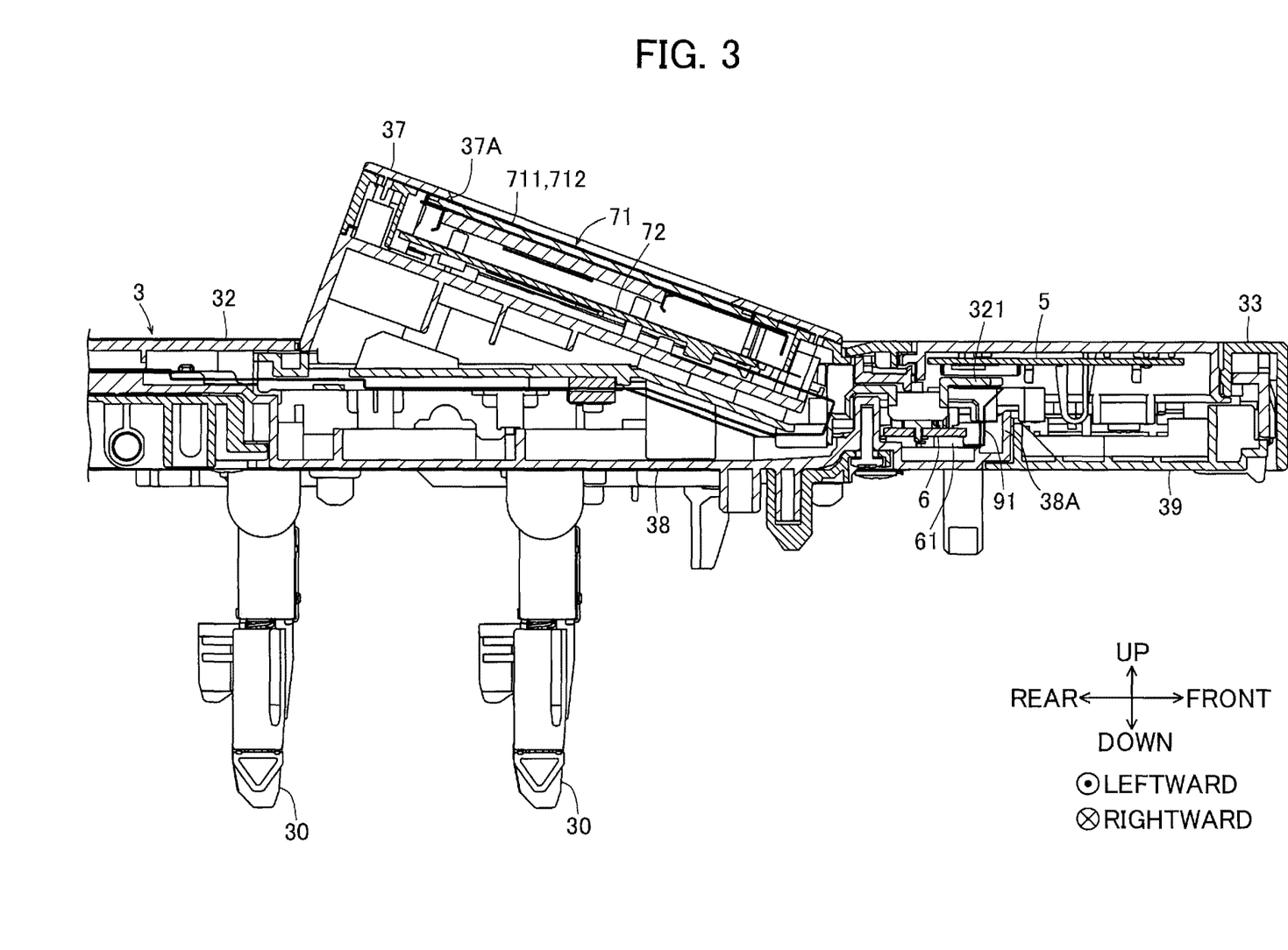
FIG. 3 is a cross-sectional view taken along a line in FIG. 2.
Figure 4:
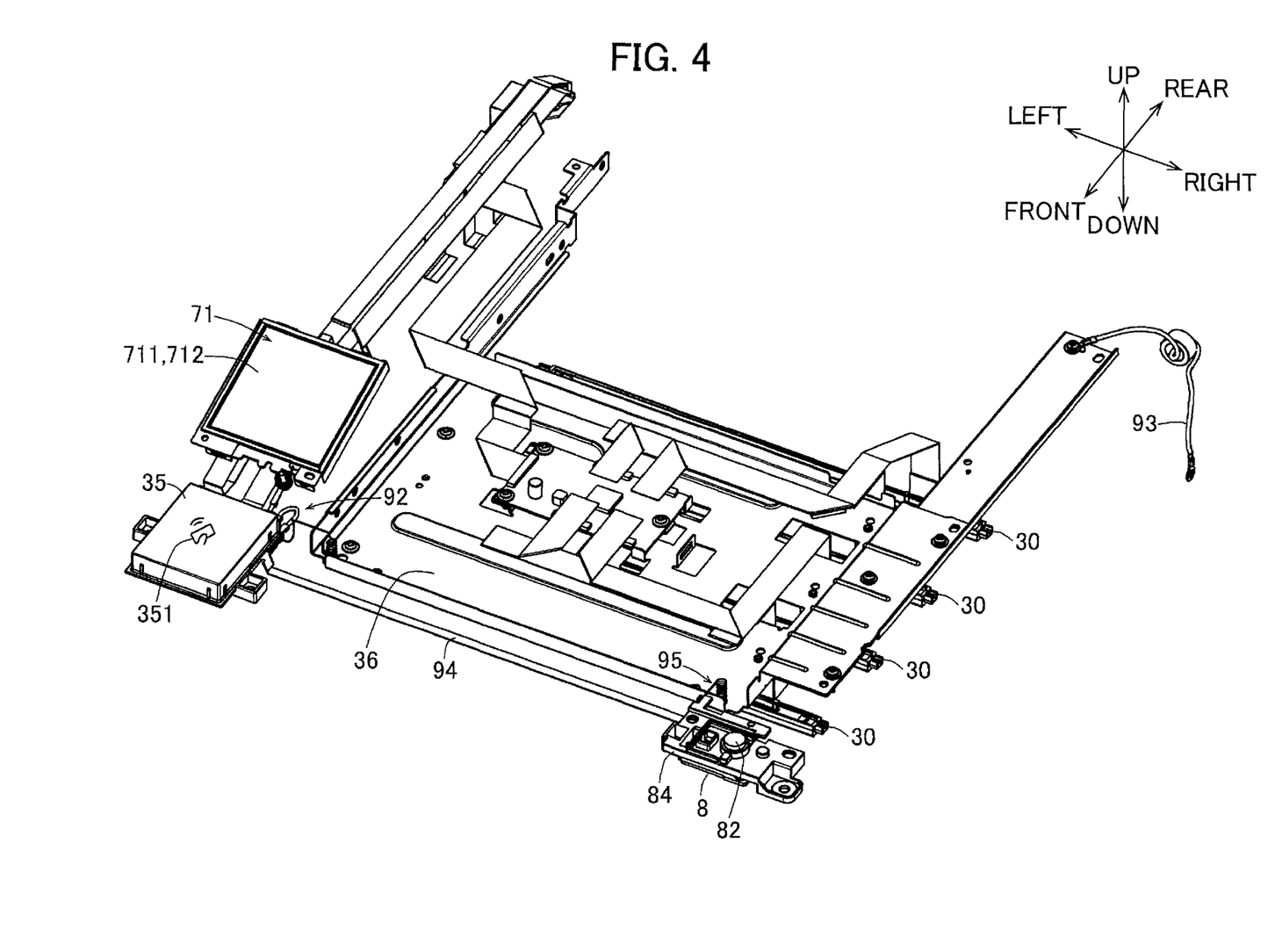
FIG. 4 is a perspective view corresponding to FIG. 2 in a state where some parts and components illustrated in FIG. 2 are removed therefrom.
Figure 5:
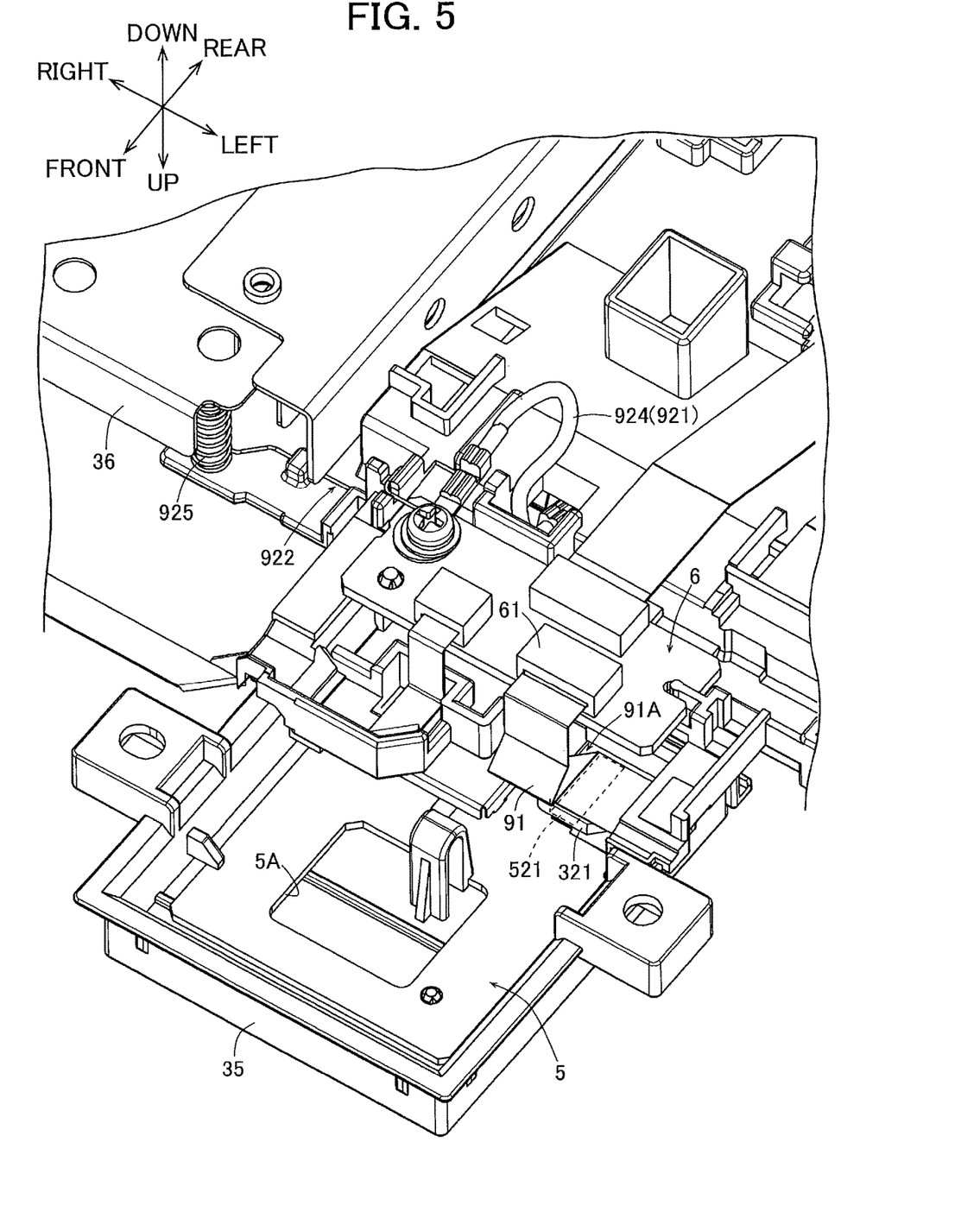
FIG. 5 is an enlarged perspective view illustrating a part of FIG. 4 and as viewed from below (in a direction opposite to a viewing direction in FIG. 4)
Figure 6:
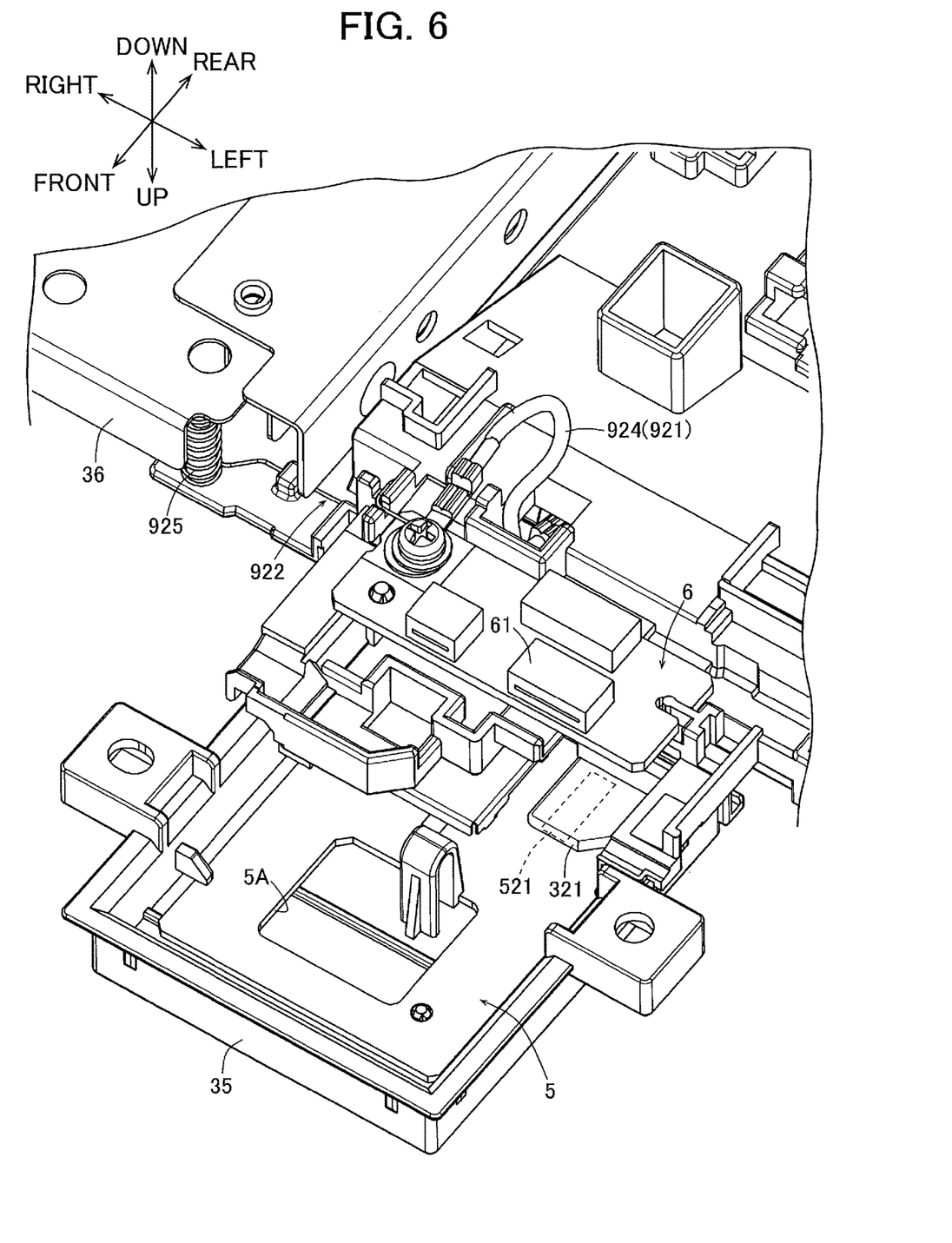
FIG. 6 is an enlarged perspective view corresponding to FIG. 5, but a first wiring 91 illustrated in FIG. 5 is removed.
Figure 7:
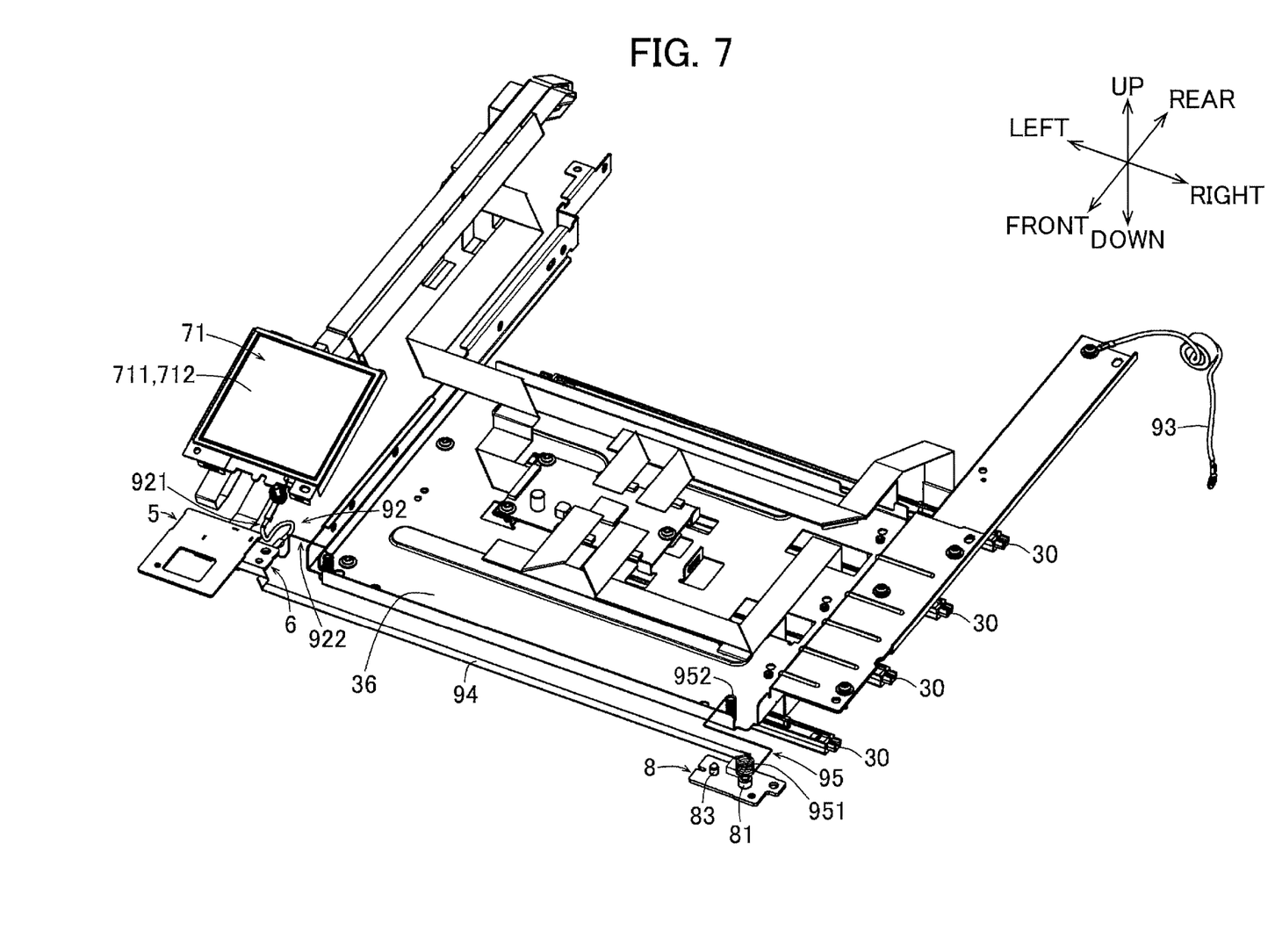
FIG. 7 is a perspective view corresponding to FIG. 4, but further parts and components illustrated in FIG. 4 are removed therefrom.
Figure 8:
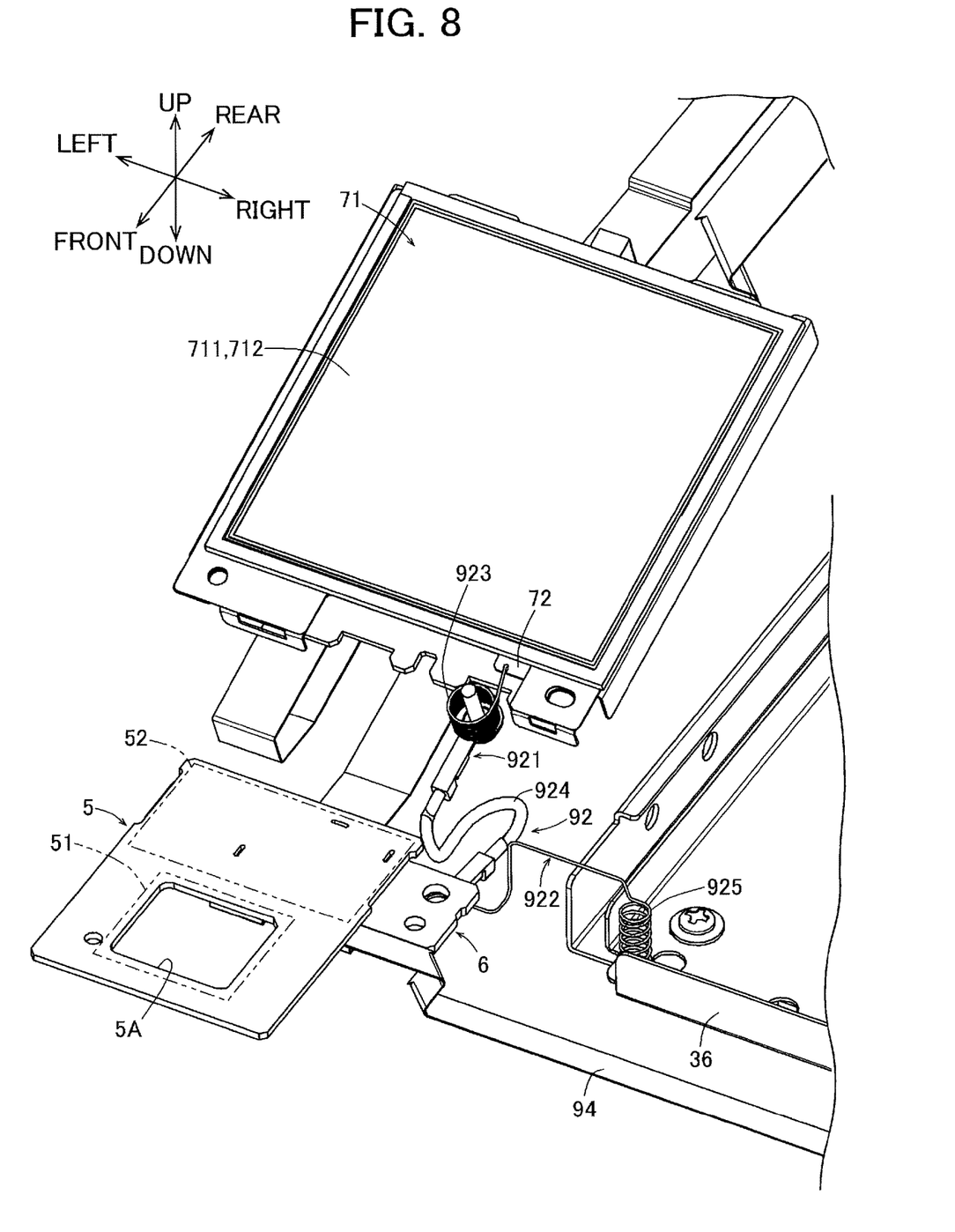
FIG. 8 is an enlarged perspective view illustrating a part of FIG. 7.
Figure 9:
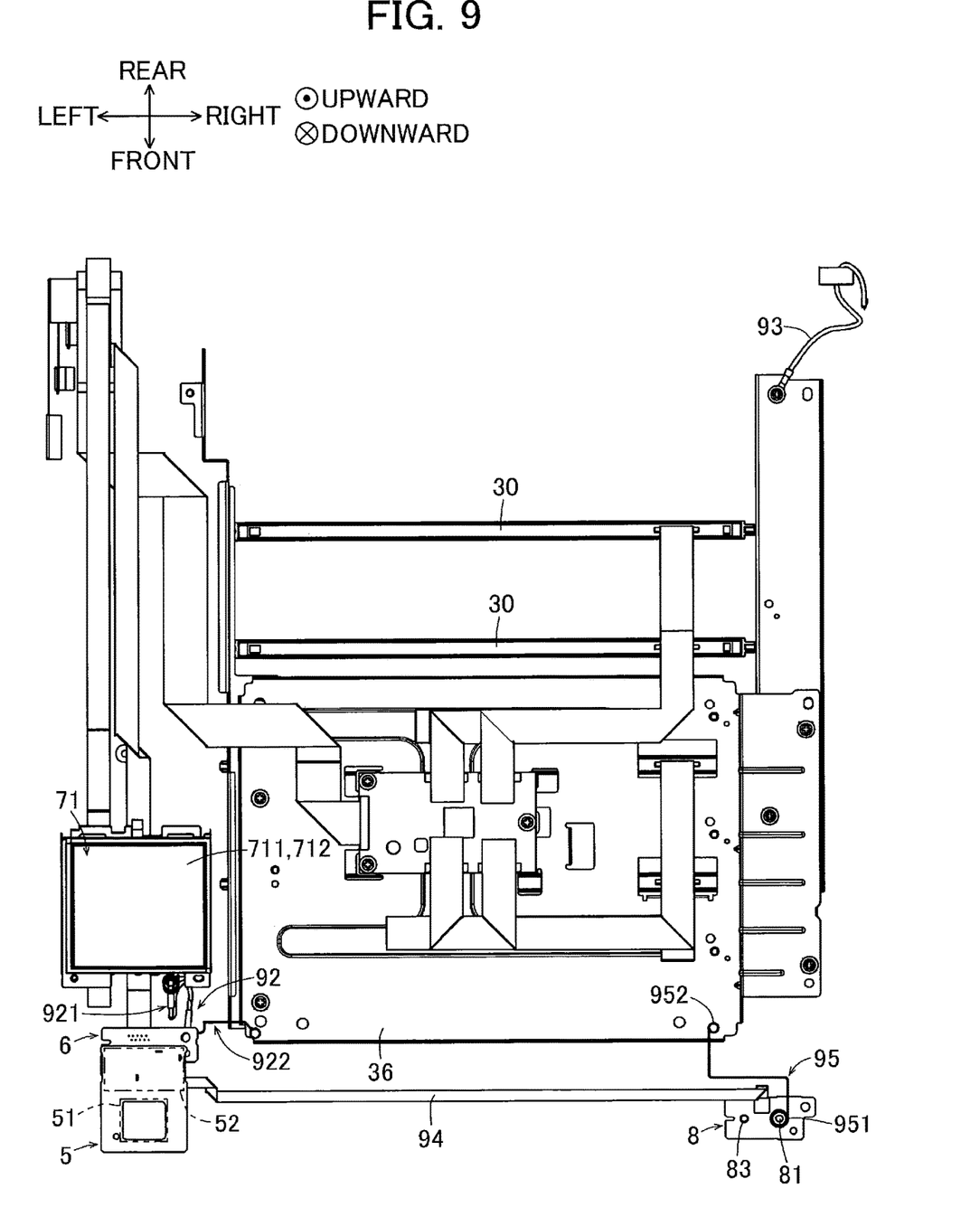
FIG. 9 is a plan view of FIG. 7.
Figure 10:
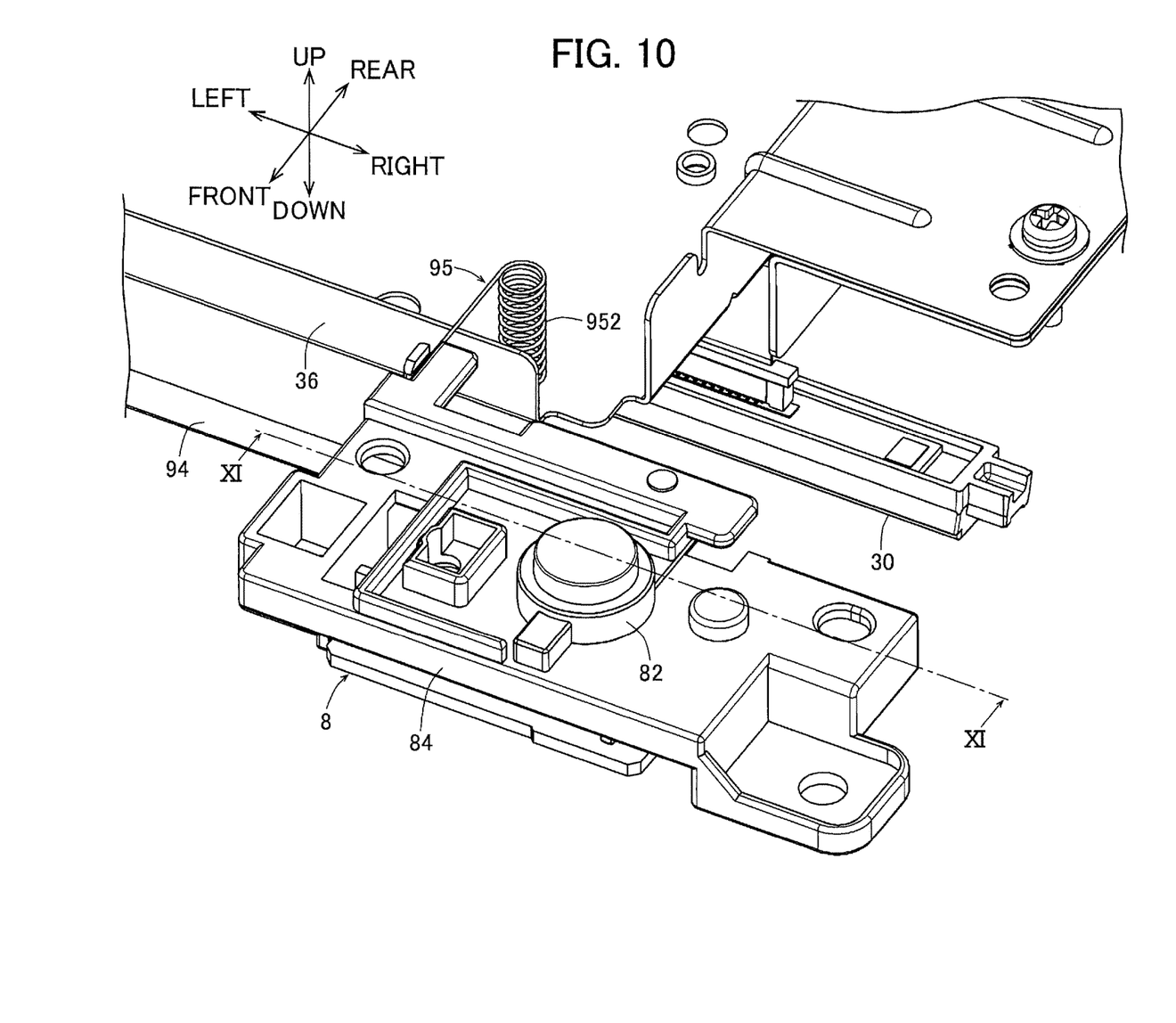
FIG. 10 is an enlarged perspective view illustrating a part of FIG. 4.
Figure 11:
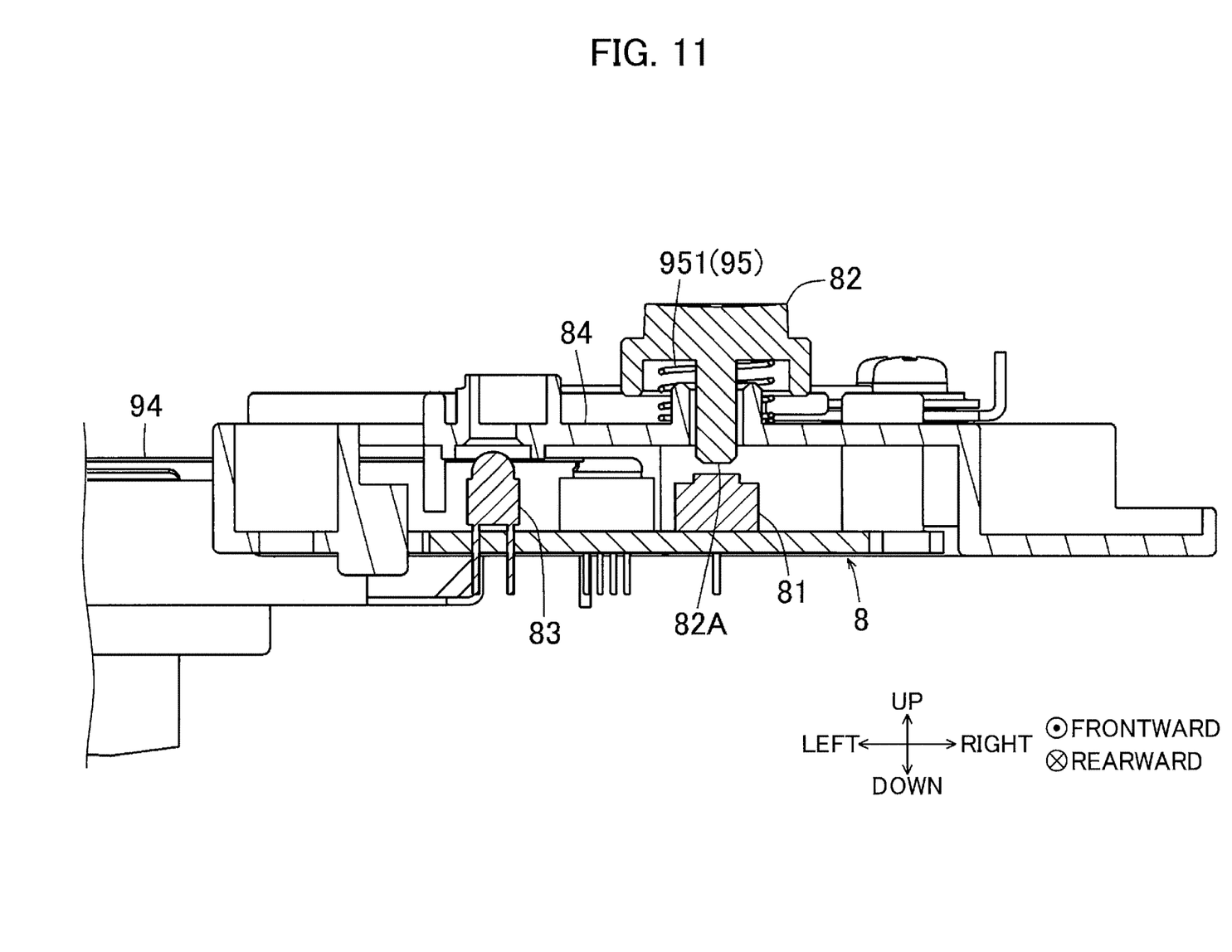
FIG. 11 is a cross-sectional view taken along a line XI-XI in FIG. 10.

FIG. 2 is a perspective view of the top cover 3 and components attached to the top cover 3. FIG. 3 is a cross-sectional view taken along a line in FIG. 2. FIG. 4 is a perspective view corresponding to FIG. 2, but some parts and components illustrated in FIG. 2 are removed therefrom. FIG. 5 is an enlarged perspective view illustrating a part of FIG. 4 as viewed from an opposite side of FIG. 4. FIG. 6 is an enlarged perspective view corresponding to FIG. 5, but a first wiring 91 illustrated in FIG. 5 is removed. FIG. 7 is a perspective view corresponding to FIG. 4, but some parts and components illustrated in FIG. 4 are removed therefrom. FIG. 8 is an enlarged perspective view illustrating a part of FIG. 7. FIG. 9 is a plan view of FIG. 7. FIG. 10 is an enlarged perspective view illustrating a part of FIG. 4. FIG. 11 is a cross-sectional view taken along a line XI-XI in FIG. 10. Incidentally, in FIGS. 3 and 5 through 9, some electronic parts and components mounted on a short-range wireless communication circuit board 5 (described later) and on a relay circuit board 6 (described later) are not illustrated for simplification.

2.1 First Cover 32 and Second Cover 33

As illustrated in FIG. 2, the top cover 3 includes a first cover 32 and a second cover 33.

The first cover 32 has a generally rectangular shape in a plan view. The second cover 33 has a frame-like shape surrounding the first cover 32 at four sides (front, rear, left and right sides) thereof. The second cover 33 has an upper flat surface flush with an upper flat surface portion of the first cover 32. Further, the first cover 32 and the second cover 33 may be made from members of different colors to improve designability thereof.

2.2 Short-Range Wireless Communication Circuit Board, Relay Circuit Board, and First Wiring As illustrated in FIGS. 3 and 5 through 9, the short-range wireless communication circuit board 5 and the relay circuit board 6 are attached to the top cover 3. The short-range wireless communication circuit board 5 and the relay circuit board 6 are electrically connected to each other by the first wiring 91 (see FIG. 5). The relay circuit board 6 is electrically connected to a main circuit board (not illustrated) positioned on a rear portion of a left side wall of the image-forming apparatus 1. The main circuit board is configured to control overall operations of the image-forming apparatus 1.

The short-range wireless communication circuit board 5 is attached to a left front portion on an inner surface (lower surface) of the second cover 33. Specifically, the second cover 33 has a left front portion formed with an opening 33A having a generally rectangular shape, and a third cover 35 closes the opening 33A. The third cover 35 has an upper surface in flush with the upper surface of the second cover 33, and has a lower (or inner) surface to which the short-range wireless communication circuit board 5 is attached. Incidentally, the third cover 35 is not a requisite element. The short-range wireless communication circuit board 5 may be at any position on the inner (lower) surface of the second cover 33, provided that the short-range wireless communication circuit board 5 does not overlap with the discharge tray 31 at the upper surface of the top cover 3. That is, the short-range wireless communication circuit board 5 may be attached to the top cover 3 at a position offset from the discharge tray 31. For example, the short-range wireless communication circuit board 5 may be attached to a right front portion of the lower surface of the second cover 33.

The short-range wireless communication circuit board 5 is configured to perform short-range wireless communication with an external device such as IC card and a smartphone. In the present embodiment, the short-range wireless communication circuit board 5 employs the NFC (near-field communication). The short-range wireless communication circuit board 5 is a circuit board having a generally rectangular plate shape. The short-range wireless communication circuit board 5 includes an antenna 51 configured to transmit/receive radio waves for the communication with the external device, and circuits 52 electrically connected to the antenna 51, as illustrated in FIG. 8.

The short-range wireless communication circuit board 5 is positioned directly below the opening 33A and extends in parallel to the upper surface of the second cover 33. The short-range wireless communication circuit board 5 has a front portion formed with a generally rectangular opening 5A. The antenna 51 is a loop antenna mounted on the short-range wireless communication circuit board 5 to surround the opening 5A.

The circuits 52 include a communication circuit and a detection circuit, and the like. The communication circuit functions to perform signal processing with respect to the radio waves transmitted and received. The detection circuit functions to detect an intensity of the radio waves transmitted from and received in the antenna 51 by detecting electrical currents flowing through the antenna 51.

The circuits 52 include a first terminal 521 (see FIG. 5) to which one end of the first wiring 91 is connected. In the present embodiment, the first terminal 521 is directly formed on the short-range wireless communication circuit board 5 by printing or the like, and the one end of the first wiring 91 is direct-mounted on the first terminal 521. Incidentally, the first terminal 521 may be a connector.

As illustrated in FIG. 2, a mark 351 is printed on the third cover 35. The mark 351 is indicative of the position of the antenna 51, and is printed on an upper surface of the third cover 35 at a position facing the antenna 51.

With this structure, a user can put the external device closer to the antenna 51 while referring to the mark 351 as a criterion to perform wireless communication between the external device and the image-forming apparatus 1. Incidentally, the third cover 35 may have a part formed of a light transmissive member, and a light source such as a light emitting diode may be provided directly below the light transmissive member. This configuration may allow the mark 351 to illuminate to indicate the position of the antenna 51. The mark 351 may be sized and shaped as appropriate.

The relay circuit board 6 is attached to the left front portion on the inner surface of the first cover 32. The relay circuit board 6 is configured to relay connection between the short-range wireless communication circuit board 5 and the main circuit board. The employment of the relay circuit board 6 can reduce a length of a wiring in comparison with a direct connection between the short-range wireless communication circuit board 5 and the main circuit board. Providing the relay circuit board 6 between the short-range wireless communication circuit board 5 the main circuit board can thus suppress generation of noise.

The relay circuit board 6 includes a second terminal 61 (see FIG. 5) to which another end of the first wiring 91 is connected. The relay circuit board 6 extends in a direction perpendicular to an extending direction of the first wiring 91. That is, a direction in which the first wiring 91 is connected to the first terminal 521 is perpendicular to a direction in which the first wiring 91 is connected to the second terminal 61. In the present embodiment, the second terminal 61 is a connector, and the other end of the first wiring 91 is mounted on the connector. Incidentally, the second terminal 61 may be provided as a member directly printed on the relay circuit board 6.

As illustrated in FIGS. 3, 8 and 9, the relay circuit board 6 has a front portion positioned below and overlapped with a rear portion of the circuits 52 in the up-down direction. With this structure, a space saving layout of the short-range wireless communication circuit board 5 and the relay circuit board 6 in the front-rear direction can be achieved. Incidentally, the positional relationship between the short-range wireless communication circuit board 5 and the relay circuit board 6 in the up-down direction may be reversed.

In this way, at least a part of the circuits 52 and at least a part of the short-range wireless communication circuit board 5 are arranged to be overlapped with each other in the up-down direction. Such overlapping layout in the up-down direction can provide a space saving layout of the short-range wireless communication circuit board 5 and the relay circuit board 6, in comparison with a horizontally side-by-side layout of the short-range wireless communication circuit board 5 and the relay circuit board 6. Hence, the top cover 3 can have a reduced length in the horizontal direction (in the front-rear direction according to the embodiment), thereby making the image-forming apparatus 1 smaller in size.

Further, the antenna 51 and the relay circuit board 6 are preferably positioned offset from each other in the horizontal direction. That is, the antenna 51 and the relay circuit board 6 are preferably not overlapped with each other in the up-down direction. Such horizontal layout can suppress communication disturbance through the antenna 51 due to the noise released from the relay circuit board 6.

In a specification incorporating the short-range wireless communication circuit board 5 according to the present embodiment, the short-range wireless communication circuit board 5 is mounted through attachment thereof to the second cover 33. On the other hand, in a specification without the short-range wireless communication circuit board 5, a cover having a smaller size than the second cover 33 may be employed.

As illustrated in FIG. 5, the first wiring 91 is constituted by a flexible flat cable in the present embodiment. The first wiring 91 has folded back portions 91A including at least one right-angled folded back portion. According to the present embodiment, the flexible flat cable has five folded back portions 91A including a single right-angled folded back portion. Since the first wiring 91 is the flexible flat cable having the folded back portions 91A including the single right-angled folded back portion, the folded back portions 91A can restrict a part of the first wiring 91 extending frontward from the second terminal 61 from approaching the antenna 51 due to deflection, thereby suppressing the communication disturbance through the antenna 51.

2.3 Insulating Portion 321

As illustrated in FIGS. 5 and 6, the first cover 32 further includes an insulating portion 321. The insulating portion 321 is made from an insulating material such as resin and is integrally molded with the first cover 32. The insulating portion 321 has a plate-like shape extending through a position between the folded portion 91A of the first wiring 91 and the short-range wireless communication circuit board 5. By shielding the folded portion 91A from the short-range wireless communication circuit board 5, the insulating portion 321 can restrain the first wiring 91 from coming into contact with the short-range wireless communication circuit board 5.

2.4 Operation Panel 10, Panel Board 72, Sheet Metal Member 36, and First Ground Wire 92

As illustrated in FIGS. 2, 3, 8 and 9, an operation panel 71 and a panel board 72 are attached to the top cover 3. Further, the top cover 3 includes a sheet metal member 36, as illustrated in FIGS. 4 and 7 through 10. The panel board 72 is grounded to the sheet metal member 36 by a first ground wire 92 through the relay circuit board 6. The sheet metal member 36 is grounded to the housing 2 (a right side wall of the housing 2) by a ground wire 93 (see FIGS. 2, 4 and 9) connected to a right rear portion of the sheet metal member 36.

As illustrated in FIGS. 2 and 3, a fourth cover 37 is also provided at the first cover 32. The fourth cover 37 is positioned at a left front portion of the first cover 32, and has an opening 37A. The fourth cover 37 has a generally rectangular shape in a plan view, and has a generally triangular shape in a side view. The operation panel 71 is attached to the fourth cover 37 to face the opening 37A. The operation panel 71 includes a display portion 711 constituted by a liquid crystal panel, and the like, and an operating portion 712 constituted by a touch panel, and the like.

As illustrated in FIGS. 3 and 8, the panel board 72 is attached to the fourth cover 37 at a position below the operation panel 71. Incidentally, the position of the panel board 72 may be arbitrary as long as the panel board 72 is positioned beside the short-range wireless communication circuit board 5. The panel board 72 is connected to the operation panel 71 and the main circuit board, and is configured to control the operation panel 71.

As illustrated in FIG. 4, the sheet metal member 36 constitutes a generally center portion of the top cover 3 to secure a rigidity of the top cover 3. The sheet metal member 36 supports a circuit board and wirings for the LED heads 30.

As illustrated in FIGS. 5 and 8, the first ground wire 92 includes a first connecting line 921 connecting the panel board 72 to the relay circuit board 6, and a second connecting line 922 connecting the relay circuit board 6 to the sheet metal member 36. The first connecting line 921 includes a coil spring 923 connected to the panel board 72 and a cable 924 connected to the relay circuit board 6. The cable 924 and the coil spring 923 are jointly fastened together by a screw for electrical conduction.

The second connecting line 922 is constituted by a wire spring having one end provided with a first coil portion 925 in contact with the sheet metal member 36. As illustrated in FIG. 5, the second connecting line 922 has another end fastened to the relay circuit board 6 along with the cable 924 of the first connecting line 921 by a screw. For assembly, after the other end portion of the second connecting line 922 is fastened to the relay circuit board 6, the sheet metal member 36 is attached to a first frame 38 from below, thereby automatically bringing the first coil portion 925 into contact with the sheet metal member 36. Thus, assembly of the top cover 3 can be facilitated.

Due to the provision of the relay circuit board 6, the first ground wire 92 can be divided into the first connecting line 921 and the second connecting line 922. This configuration can realize easy arrangement of the first ground wire 92 without interference with neighboring components. Further, the sheet metal member 36 which functions to secure the rigidity of the top cover 3 can also be used as a ground, thereby reducing the number of necessary parts.

2.5 First Frame 38 and Second Frame 39

As illustrated in FIG. 3, the top cover 3 also includes the first frame 38 covering a lower surface of the first cover 32, and a second frame 39 covering the lower surface of the second cover 33. The first frame 38 includes a wall portion 38A positioned between the relay circuit board 6 and the second frame 39. In the present embodiment, the wall portion 38A protrudes upward from a front end of the first frame 38. The relay circuit board 6 is positioned rearward of and adjacent to the wall portion 38A.

The wall portion 38A can intercept static electricity generated by user's touching the second frame 39 for opening and closing the top cover 3, thereby suppressing transmission of the static electricity to the relay circuit board 6. Further, the wall portion 38A has an upper end positioned above the relay circuit board 6. With this configuration, the wall portion 38A can enhance its interception property against the static electricity.

2.6 Power Button Circuit Board 8, Power Button Cover 82, Second Wiring 94, and Second Ground Wire 95

As illustrated in FIGS. 2, 4, 7, and 9 through 11, a power button circuit board 8, a power button cover 82, and a power button circuit board cover 84 are attached to the top cover 3. Further, the power button circuit board 8 and the relay circuit board 6 are connected to each other by a second wiring 94. The power button cover 82 is grounded to the sheet metal member 36 through a second ground wire 95.

As illustrated in FIGS. 7 and 11, the power button circuit board 8 is attached to a right front portion on the inner surface (lower surface) of the second cover 33. Incidentally, the short-range wireless communication circuit board 5 may be at any position on the inner surface of the second cover 33, provided that the short-range wireless communication circuit board 5 does not overlap with the discharge tray 31 on the upper surface of the top cover 3. For example, the short-range wireless communication circuit board 5 may be positioned at a left front portion on the inner surface of the second cover 33.

Preferably, as in the present embodiment, the relay circuit board 6 be positioned at the left front portion of the top cover 3, and the power button circuit board 8 be positioned at the right front portion of the top cover 3. With the structure, the power button circuit board 8 can be positioned in an empty space of the second cover 33 available at a position opposite to the short-range wireless communication circuit board 5 on the second cover 33 with respect to the left-right direction.

The power button circuit board 8 includes a power button 81 and an LED 83. The power button 81 is configured to switch ON/OFF a power source of the image-forming apparatus 1. The power button 81 has an upper surface provided with a depression switch. The LED 83 is a light source configured to indicate ON/OFF states of the power source of the image-forming apparatus 1 in response to an operation to the power button 81.

The power button cover 82 is inserted in an opening portion 33B (see FIG. 2) formed in the second cover 33 to cover the power button 81, so that a user can manipulate (depress) the power button 81 over the power button cover 82. As illustrated in FIGS. 10 and 11, the power button cover 82 is supported by the power button circuit board cover 84 through the second ground wire 95. The power button cover 82 includes a protrusion 82A configured to depress the power button 81. The power button circuit board cover 84 covers the power button circuit board 8 and supports the second ground wire 95 and the power button cover 82.

As illustrated in FIG. 7, the second ground wire 95 is constituted by a wire spring. The wire spring has one end portion in a form of a second coil portion 951 supporting the power button cover 82 to enable user's operations to the power button cover 82 (see FIG. 11). The wire spring has another end portion in a form of a third coil portion 952 in contact with the sheet metal member 36 (see FIGS. 7 and 10). As illustrated in FIG. 11, the second coil portion 951 has a lower end seated on an upper surface of the power button circuit board cover 84, and has an upper end supporting the power button cover 82. Hence, the power button cover 82 is movable in the up-down direction to enable the power button 81 to be depressed by a user.

For assembly, after the second coil portion 951 is seated on the power button circuit board cover 84, the sheet metal member 36 is attached to the first frame 38 from below, by which attachment the third coil portion 952 can be automatically brought into contact with the sheet metal member 36. Thus, assembly of the top cover 3 can be facilitated.

With the second ground wire 95 as described above, the button cover 82 can be grounded to the sheet metal member 36 for electrostatic discharge generated when the user operates the power button cover 82. Further, the second ground wire 95 can vertically movably supports the power button cover 82. Hence, the second ground wire 95 can also function to provide a requisite resiliency for movably supporting the power button cover 82.

While the description has been made in detail with reference to the embodiments, it would be apparent to those skilled in the art that many modifications and variations may be made thereto.

REMARKS

The image-forming apparatus 1 is an example of an image-forming apparatus. The housing 2 is an example of a housing. The top cover 3 is an example of a top cover. The short-range wireless communication circuit board 5 is an example of a short-range wireless communication circuit board. The relay circuit board 6 is an example of a relay circuit board. The first wiring 91 is an example of a first wiring. The antenna 51 is an example of an antenna of the short-range wireless communication circuit board. The circuits 52 is an example of a circuit of the short-range wireless communication circuit board. The first terminal 521 is an example of a first terminal. The second terminal 61 is an example of a second terminal. The insulating portion 321 is an example of an insulating portion of the top cover. The sheet metal member 36 is an example of a sheet metal member. The first cover 32 is an example of a first cover. The second cover 33 is an example of a second cover. The first frame 38 is an example of a first frame. The second frame 39 is an example of a second frame. The operation panel 71 is an example of an operation panel. The panel board 72 is an example of a panel board. The first ground wire 92 is an example of a first ground wire. The power button circuit board 8 is an example of a power button circuit board. The second wiring 94 is an example of a second wiring. The power button cover 82 is an example of a power button cover. The second ground wire 95 is an example of a second ground wire.

What is claimed is:

1. An image-forming apparatus comprising:
   a housing having an opening;
   a top cover configured to cover the opening;
   a short-range wireless communication circuit board attached to the top cover, the short-range wireless communication circuit board comprising an antenna configured to transmit/receive radio waves, and a circuit electrically connected to the antenna;
   a relay circuit board attached to the top cover;
   a first wiring connecting the short-range wireless communication circuit board and the relay circuit board to each other;
   an operation panel attached to the top cover; and
   a panel board attached to the top cover and configured to control the operation panel,
   wherein at least a part of the circuit and at least a part of the relay circuit board are overlapped with each other in an up-down direction, and
   wherein the panel board, the short-range wireless communication circuit board and the relay circuit board are arranged in order from top in the up-down direction.
2. The image-forming apparatus according to claim 1, wherein the antenna and the relay circuit board are arranged offset from each other in a horizontal direction perpendicular to the up-down direction.
3. The image-forming apparatus according to claim 1, wherein the circuit includes a first terminal to which one end of the first wiring is connected,
   wherein the relay circuit board includes a second terminal to which another end of the first wiring is connected, the second terminal extending in a direction perpendicular to a direction in which the first terminal is connected to the one end of the first wiring, and
   wherein the first wiring is a flexible flat cable having folded back portions including a right-angled folded back portion.
4. The image-forming apparatus according to claim 3, wherein the top cover includes an insulating portion made from an electrically insulating material and extending through a position between the folded back portions and the short-range wireless communication circuit board to shield communication between the short-range wireless communication circuit board and the folded back portions.
5. The image-forming apparatus according to claim 1, further comprising:
   a first ground wire grounding the panel board through the relay circuit board.
6. The image-forming apparatus according to claim 5, wherein the top cover comprises a sheet metal member, wherein the first ground wire comprises: a first connecting line connecting the panel board to the relay circuit board; and a second connecting line connecting the relay circuit board to the sheet metal member.
7. The image-forming apparatus according to claim 6, wherein the second connecting line has one end portion provided with a first coil portion in contact with the sheet metal member.
8. The image-forming apparatus according to claim 1, wherein the top cover comprises a first cover and a second cover surrounding the first cover,
   wherein the relay circuit board is attached to the first cover, and
   wherein the short-range wireless communication circuit board is attached to the second cover.
9. The image-forming apparatus according to claim 8, wherein the top cover further comprises:
   a first frame covering a lower surface of the first cover and having a wall portion; and
   a second frame covering a lower surface of the second cover, the wall portion being positioned between the relay circuit board and the second frame.
10. The image-forming apparatus according to claim 1, further comprising:
    a power button circuit board attached to the top cover and including a power button, the power button circuit board being configured to switch on and off a power source of the image-forming apparatus; and
    a second wiring connecting the power button circuit board to the relay circuit board,
    wherein the relay circuit board and the power button circuit board are positioned at opposite sides of the top cover.
11. The image-forming apparatus according to claim 10, further comprising:
    a power button cover covering the power button to enable the power button to be operated; and
    a second ground wire grounding the power button cover, the second ground wire being a wire spring whose one end portion is provided with a second coil portion movably supporting the power button cover.
12. The image-forming apparatus according to claim 11, wherein the top cover comprises a sheet metal member, and wherein the second ground wire has another end portion provided with a third coil portion in contact with the sheet metal member, the second ground wire grounding the power button cover through the sheet metal member.

13. The image-forming apparatus according to claim 1, wherein the top cover has an upper surface formed with a discharge tray for receiving a sheet discharged from the housing through the opening, and
wherein the short-range wireless communication circuit board is attached to the top cover at a position offset from the discharge tray.

14. An image-forming apparatus comprising:
a housing having an opening;
a top cover configured to cover the opening;
a short-range wireless communication circuit board attached to the top cover, the short-range wireless communication circuit board comprising an antenna configured to transmit/receive radio waves, and a circuit electrically connected to the antenna;
a relay circuit board attached to the top cover; and
a first wiring connecting the short-range wireless communication circuit board and the relay circuit board to each other,
wherein at least a part of the circuit and at least a part of the relay circuit board are overlapped with each other in an up-down direction,
wherein the circuit includes a first terminal to which one end of the first wiring is connected,
wherein the relay circuit board includes a second terminal to which another end of the first wiring is connected, the second terminal extending in a direction perpendicular to a direction in which the first terminal is connected to the one end of the first wiring, and
wherein the first wiring is a flexible flat cable having folded back portions including a right-angled folded back portion.

15. An image-forming apparatus comprising:
a housing having an opening;
a top cover configured to cover the opening;
a short-range wireless communication circuit board attached to the top cover, the short-range wireless communication circuit board comprising an antenna configured to transmit/receive radio waves, and a circuit electrically connected to the antenna;
a relay circuit board attached to the top cover;
a first wiring connecting the short-range wireless communication circuit board and the relay circuit board to each other;
an operation panel attached to the top cover;
a panel board attached to the top cover and configured to control the operation panel; and
a first ground wire grounding the panel board through the relay circuit board,
wherein at least a part of the circuit and at least a part of the relay circuit board are overlapped with each other in an up-down direction.

* * * * *